United States Patent [19]
Howard

[11] Patent Number: 5,178,088
[45] Date of Patent: Jan. 12, 1993

[54] AMPHIBIOUS VEHICLE

[76] Inventor: Allegra E. Howard, 17635 Grandville, Detroit, Mich. 48219

[21] Appl. No.: 744,542

[22] Filed: Aug. 13, 1991

[51] Int. Cl.$^5$ .............................................. B63B 35/00
[52] U.S. Cl. ..................................... 114/270; 440/30; 440/100
[58] Field of Search ..................... 440/90, 98, 100, 26, 440/29, 30; 114/270, 344; 280/261

[56] References Cited

U.S. PATENT DOCUMENTS

| | | | |
|---|---|---|---|
| 2,503,111 | 4/1950 | Higgins | 114/270 |
| 3,450,089 | 6/1969 | Lippincott | 114/270 |
| 3,559,611 | 2/1971 | Cushman | 114/270 |
| 3,755,835 | 9/1973 | Boersig | 114/344 |

Primary Examiner—Sherman D. Basinger
Attorney, Agent, or Firm—Dykema Gossett

[57] ABSTRACT

An amphibious vehicle has a hull with a seat portion formed on its upper side. An operator seated upon the seat would straddle the hull. The hull has a flotation body for buoyancy and four hollow, cylindrical wheels also contribute to the buoyancy. Handlebars are used to steer the wheels and to operate a rudder so that the amphibious vehicle may be operated on firm, sandy, soft, and liquid surfaces. The wheels have vanes which radiate outwardly and curve counterclockwise, viewing each wheel in the foreground and the hull in the background. This causes the vaned wheels to grip soil or mud and to channel water rearwardly to propel the amphibious vehicle forwardly. The vehicle is propelled by a pedaling mechanism.

6 Claims, 3 Drawing Sheets

AMPHIBIOUS VEHICLE

RELATED ART REFERENCES

The present invention relates to amphibious vehicles and more particularly to sports vehicles whose main purpose is to enable progress to be made over courses on firm, sandy, soft, and liquid surfaces. Still more particularly, the present invention relates to amphibious sports vehicles that are adapted for use on sandy beaches, in mud, and in water.

A number of U.S. patent references relate to the same field of art that relates to the present invention.

U.S. Pat. No. 4,655,717 issued to Cartella discloses an amphibious vehicle in the embodiment of a tricycle that has a skeletal frame with buoyant wheels.

U.S. Pat. No. 4,631,037 issued to Dickens discloses a dual wheel device that has a pontoon structure for buoyancy. The dual wheels act as paddle wheels for propelling the device. Accordingly, this device is an aquatic vehicle and not particularly adapted for firm and soft surfaces.

U.S. Pat. No. 4,500,297 issued to Boulva discloses a paddle wheel propelled watercraft. This device, as the device disclosed by Dickens, is adapted for use in the water and not for land use.

U.S. Pat. No. 4,395,237 issued to Watsasho discloses a vehicle that has a skeletal frame and one wheel front and aft, respectively. Accordingly, it is a bicycle for land use. The bicycle, however, has attachable floats on each wheel. The floats are adapted to be placed on each side of each wheel to stabilize the bicycle and keep it afloat in water.

U.S. Pat. Nos. 4,077,351 and 3,091,209 issued to Girona and Leiberman, respectively, describe amphibious tricycles with buoyant wheel structure and skeletal frames.

U.S. Pat. No. 2,323,261 issued to Vigo also discloses a structure like that of the Girona and Leiberman structures, except that the Vigo vehicle uses larger wheels for flotation than does the other two similar devices.

U.S. Pat. No. 3,249,084 issued to Plants describes a water "tricycle" that is adapted particularly to water use, but may also negotiate on marsh grass and small obstructions in such watery terrain. The device comprises a skeletal tricycle structure, but with four cylindrical floats. Two of the cylindrical floats have paddle vanes and together replace the lead wheel of a standard tricycle structure.

U.S. Pat. No. 1,341,375 issued to Le Jeune discloses a device that has vanes for propulsion at the periphery of cylindrical structures. The cylindrical structures act as wheels. This device is particularly adapted to water use and not for land use.

U.S. Pat. No. 1,104,229 issued to Szegel discloses another tricycle type structure with a wheel structure that is balloon like. Propulsion vanes project from the side of the "tires" but are contained within the diameter of the tires and do not diametrically project from it.

U.S. Pat. No. 586,851 issued to Knepper discloses a two wheel vehicle with wheel structures that have vanes at their outer periphery. The device has a forward rudder structure connected to the steering handlebars of the device.

While all of these patents show activity within the art, none of them show the particular structure and advantages as claimed by the present invention which has particular objects and structure as will now be summarized.

SUMMARY OF THE INVENTION

The invention is an amphibious vehicle that has a hull with a seat portion formed on its upper side. An operator seated upon the seat would straddle the hull. The hull has a flotation body that is a hollow structure with a walled passageway extending through it for a steering column that is inserted into the walled passageway and through the flotation body without breaching its airtight interior. The airtight interior contributes to the buoyancy of the amphibious vehicle. A pair of spaced apart side skirts extend downwardly from the flotation body on each side of the hull and a stern section make up the hull structure.

Mounted on or integral with the steering column at its upper extent are handlebars for steering the amphibious vehicle. The hull is supported on a front axle by bearings supported by the steering column which terminates at its lower extent at a yoke mounted on the front axle.

A crank shaft is retained across the hull. Mounted on the crank shaft is a pedal assembly and a sprocket wheel. When the pedals are pressed and released in a pedaling operation, rotation is imparted to the crank shaft and the sprocket wheel mounted thereon.

Mounted on the front axle is another sprocket wheel which, when linked by a sprocket chain with the sprocket wheel mounted on the crank shaft, is driven by the revolutions of the crank shaft as the pedals are pressed and released or "pedaled." Also mounted on the front axle is a driving sprocket wheel which revolves as the front axle revolves under the influence of the driven sprocket linked to the crank shaft. The driving, front axle sprocket wheel is linked to a rear axle via a sprocket chain and a driven sprocket wheel mounted on the rear axle. Thus revolution of the crank shaft is imparted to the front axle, which in turn imparts revolution to the rear axle.

Mounted on each end of the front and rear axles are vaned, cylindrical wheels having hollow chambers that also contribute to the buoyancy of the amphibious vehicle. The vanes on each wheel radiate outwardly and curve counterclockwise, viewing the wheel in the foreground and the hull in the background. This causes vaned wheel to grip soil or mud and to channel water rearwardly to propel the amphibious vehicle forwardly.

A steering mechanism is provided for the amphibious vehicle when it is being propelled in water. The mechanism comprises the steering assembly of the handlebars and steering column operatively connected to a rudder. By turning the handlebars to the right, for example, an operator of the amphibious vehicle is capable of steering the amphibious vehicle to the right, as the blade of the rudder is turned to the right side of hull.

It is, in accordance with the structure just summarily described, one object of the present invention to provide a novel and improved amphibious vehicle that is capable of progressing over courses on firm, sandy, soft, and liquid surfaces.

It is another object of the present invention to provide an amphibious sports vehicle that has a common steering means available to the operator whether the vehicle is on firm, sandy, soft, and liquid surfaces.

It is yet another object of the present invention to provide an amphibious vehicle with an improved drive mechanism where by four wheels are capable of propelling the amphibious vehicle on or over firm, sandy, soft, and liquid surfaces.

Still yet another object of the present invention is to provide an amphibious vehicle that has a buoyant body with an airtight chamber not breached by mechanisms for propulsion and steering of the vehicle.

REFERENCE TO DRAWINGS

A preferred embodiment of the amphibious vehicle according to the invention will be described by way of example only with reference to the accompanying drawings in which.

THE PREFERRED EMBODIMENT

Figure 1:
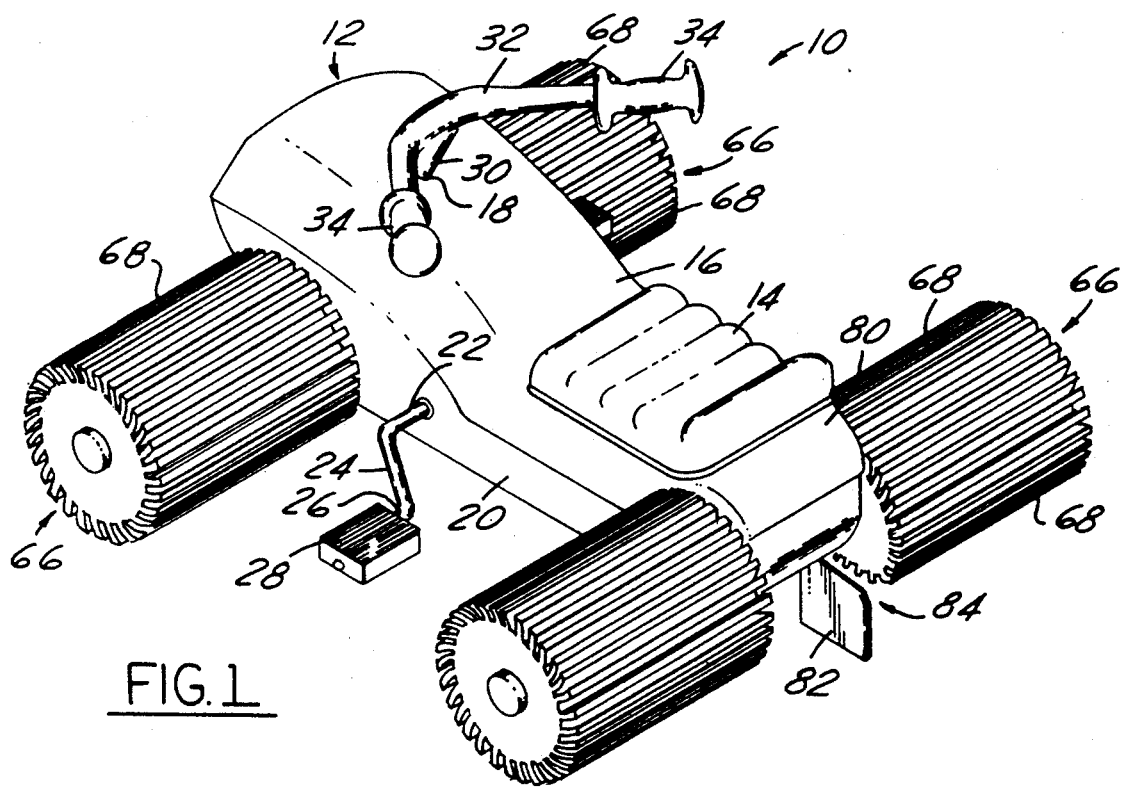
FIG. 1 is a perspective view of the amphibious vehicle according to the present invention.
Figure 2:
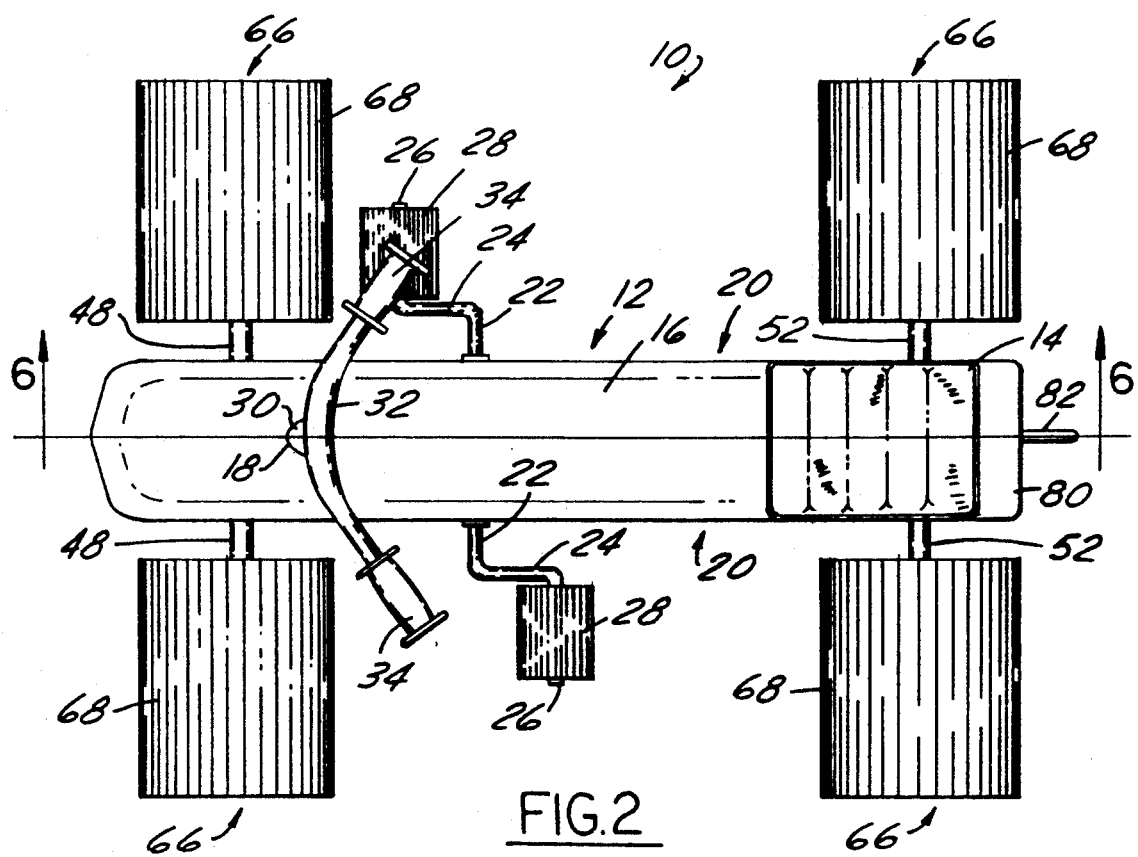
FIG. 2 is a top plan view of the amphibious vehicle shown in FIG. 1.
Figure 3:
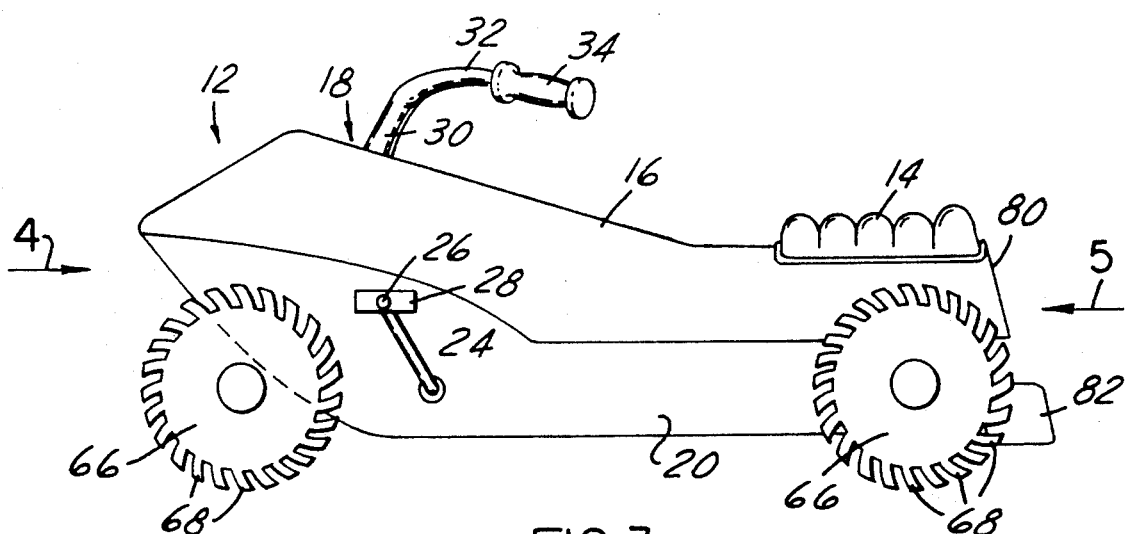
FIG. 3 is a side elevational view of the amphibious vehicle shown in FIG. 1.

Referring now to the drawings and more particularly to FIG. 1, the amphibious vehicle that is a present invention is shown generally at 10. The amphibious vehicle comprises a main body or hull 12 which has a seat portion 14 formed on the upper side of the hull 12. An operator seated on the amphibious vehicle 10 would straddle the hull 12.

Figure 6:
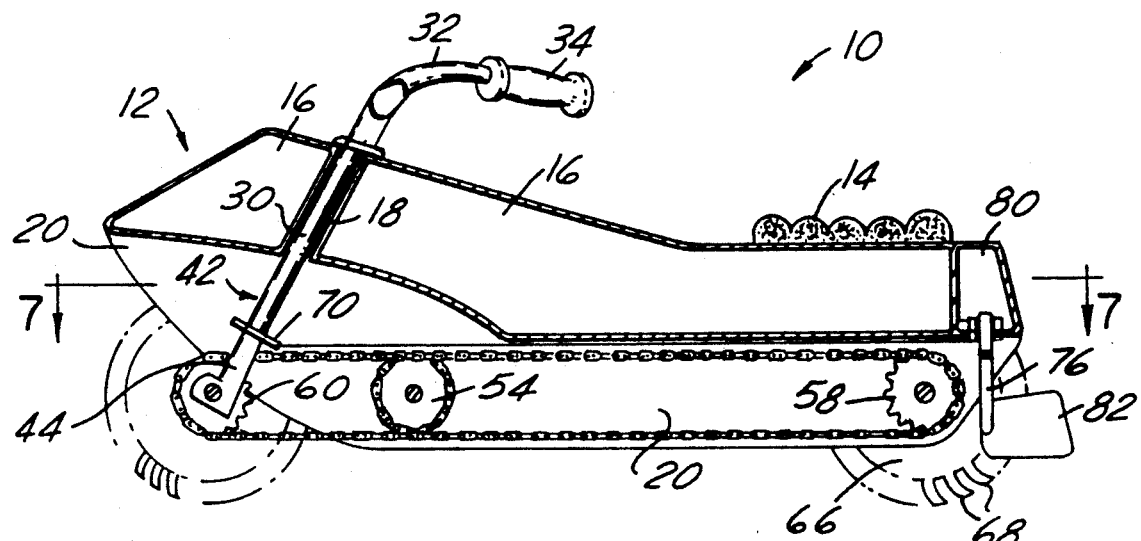
FIG. 6 is a sectional view of the amphibious vehicle shown in FIG. 2, taken in the direction of arrows 6—6.

Hull 12 has a flotation body 16, which can best be seen in FIG. 6. The flotation body 16 of the hull 12 is a hollow structure. The hollow portion 16 has a walled passageway 18 extending through a front portion of the flotation body 16. A pair of spaced apart side skirts 20 extend downwardly from the flotation body 16 one of each side of the hull 12.

Figure 7:
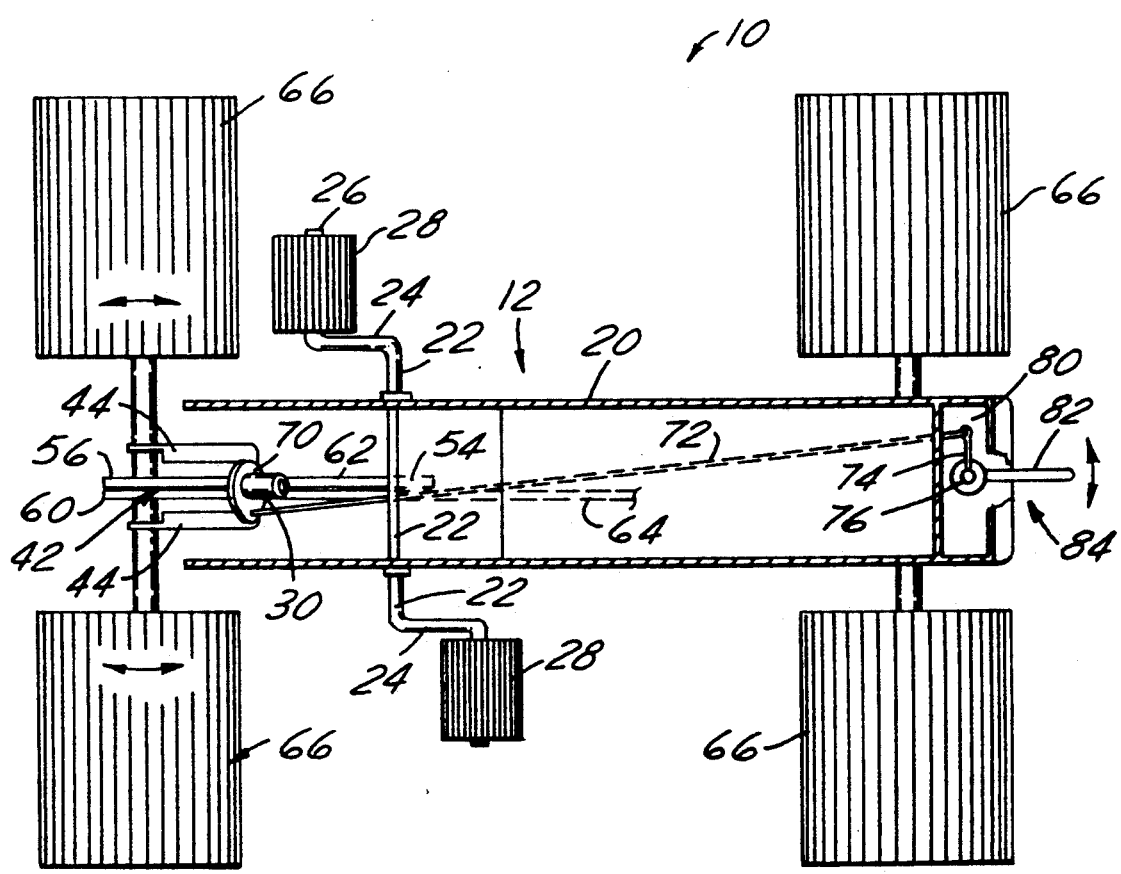
FIG. 7 is a top sectional view of the amphibious vehicle shown in FIG. 6, taken in the direction of arrows 7—7.

As can be seen in FIG. 7, a crank shaft 22 is retained transversely across and through the side skirts 20, spanning the open area between side skirts 20. The crank shaft 22 is provided with crank arms 24 and crank handles 26, both formed integrally with crank shaft 22. Each crank arm 24 extends perpendicularly from crank shaft 22 and each crank handle 26 extends perpendicularly from a corresponding crank arm 24. Rotatably secured to each handle 26 is a pedal 28. A pedaling action, whereby pedals 28 are pressed and released, imparts rotation to crank arms 24, which, in turn, imparts axial rotation to crank shaft 22. Thus, crank arms 24, crank handles 26, and pedals 28, along with an operator pedaling the amphibious vehicle 10, provide driving means for the amphibious vehicle 10. Such means may also be provided by a motorized meechanism in am manner known by those of ordinary skill in the art without departing from the scope of the present invention.

As shown more clearly in FIG. 6, the walled passageway 18 is formed integrally with the flotation body 16. Thus, the flotation body 16 defines a flotation casing for hull 12 about the passageway 18. A steering column 30 is inserted into passageway 18 to extend along passageway 18 through flotation body 16, without breaching the airtight interior of the flotation body 16, which provides buoyancy to the amphibious vehicle 10.

Steering column 30 is supplied with handlebars 32. As shown in the drawings, handlebars 32 may have handgrips 34 mounted on their free ends. The steering column 30 turns around a substantially vertical axis. Bearings 38 and 40 are secured to steering column 30 respectively at the top and bottom of the passageway 18 (which is, respectively, at the top side and bottom or underside of the flotation body 16 at the passageway 18, as can be seen in FIG. 6). Preferably, at least bearing 40 is a ball bearing, although both bearings 38 and 40 may be ball bearings. Bearings 38 and 40 keep steering column 30 from sliding axially through passageway 18 relative to hull 12.

Figure 4:
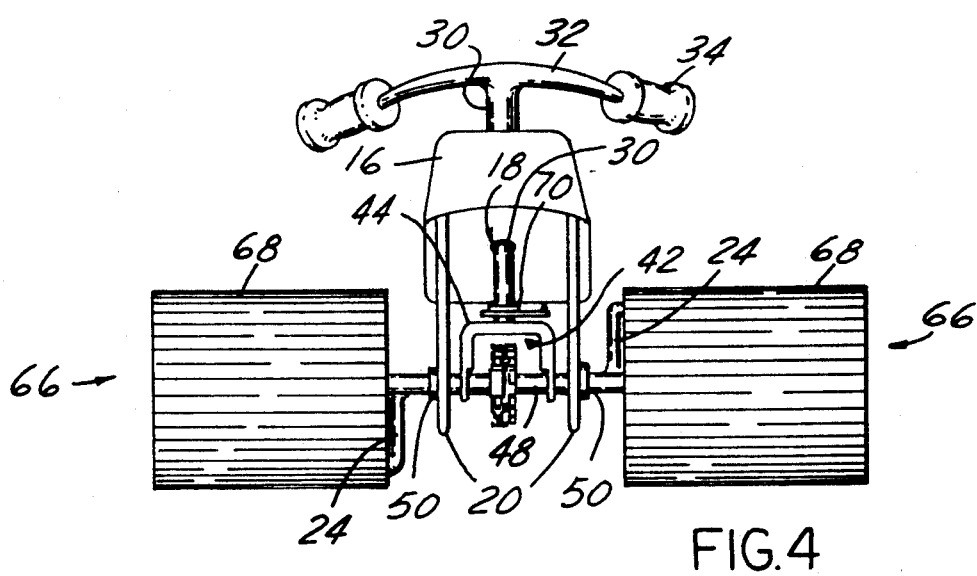
FIG. 4 is a front elevational view of the amphibious vehicle shown in FIG. 3 in the direction of arrow 4.
Figure 5:
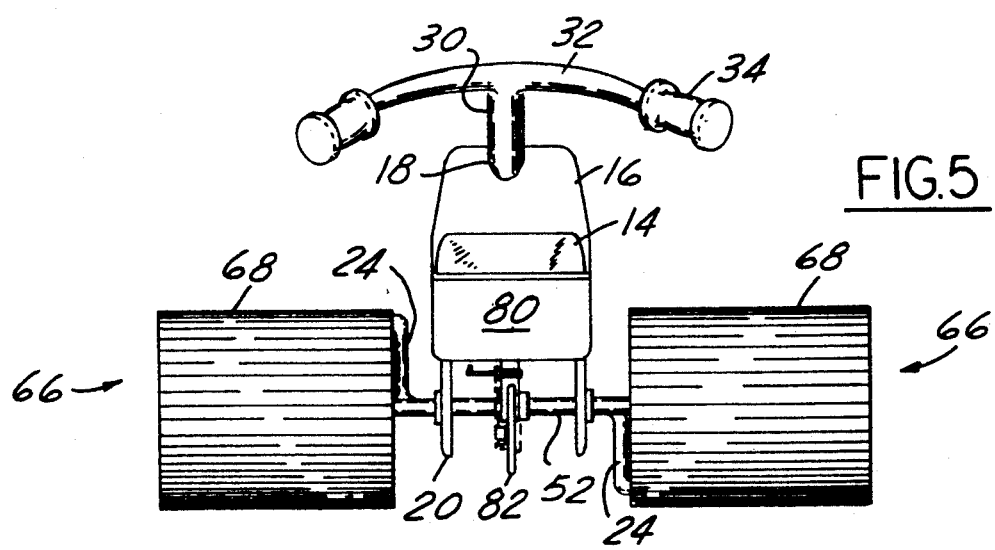
FIG. 5 is a rear elevational view of the amphibious vehicle shown in FIG. 3 in the direction of arrow 5.

Referring to FIG. 4, but as can be seen FIGS. 6 and 7, a yoke 42, which has two spaced apart arms 44 extending downwardly, is secured to steering column 30 at its lower end. The lower end of each arm 44 is provided with a bearing 46 for a front axle 48. By pivoting steering column 30, by turning handlebars 32, rotates arms 44 about the substantially vertical axis along which steering column 30 extends and pivots front axle 48, generally about its midpoint. This action accomplishes steering of the amphibious vehicle 10. Mounted rearwardly through side skirts 20 are bearings 50 for rear axle 52. While rear axle 52 may rotate within the bearings 50, rear axle 52 cannot pivot relative to the hull 12 as can front axle 48.

Mounted on crank shaft 22 is a driving sprocket wheel 54, and mounted on front axle 48 and rear axle 52, respectively, are driven sprocket wheels 56 and 58. Adjacent driven sprocket wheel 56 on front axle 48 is a driving sprocket wheel 60. Fork 42 straddles driven sprocket wheel 56 and driving sprocket wheel 60 on axle 48. Driven sprocket wheel 56 is connected to driving sprocket wheel 54 by means of a short sprocket chain 62. Driven sprocket wheel 58 is connected to driving sprocket wheel 60 by means of a long sprocket chain 64. According to this structure, pedaling to rotate crank shaft 22, rotates driving sprocket wheel 54 which by sprocket chain 62 drives driven sprocket wheel 56. Driven sprocket wheel 56 imparts rotation to front axle 48, thereby rotating driving sprocket wheel 60 which imparts its rotational motion by sprocket chain 64 to driven sprocket wheel 58. Driven sprocket wheel 58 thus causes rear axle 52 to rotate.

Cylindrical vaned wheels 66, for propelling the amphibious vehicle 10 on land and water, are secured to the free ends of front axle 48 and rear axle 52. The vaned wheels 66 are preferably watertight hollow cylindrical chambers and are buoyant in water. They may be, however, frustoconical, each comprising a watertight hollow frustoconical chamber with wheel 66 having its greatest diameter at the outermost part of wheel 66, that is the part of the wheel most removed from hull 12, and its smallest diameter at the innermost part of wheel 66, that is the part of the wheel most proximate hull 12. Vaned wheels 66 have at their radial periphery vanes 68 which extend generally radially outwardly and curve counterclockwise, viewing each wheel 66 in the foreground and hull 12 in the background. Accordingly, vanes 68 are capable of gripping sandy and soft terrain to propel amphibious vehicle 10 forward. Vanes 68 also facilitate paddling action in water to propel the amphibious vehicle forward when it floats in the water.

As can be seen in FIGS. 4, 6 and 7, steering column 30 has a disc 70 encircling it. Disc 70 has means for attaching a rod 72 at a radial distance from steering column 30. Rod 72 extends beneath hull 12, roughly parallel to the axis thereof, to an arm 74. Arm 74 is attached to a stern post 76 that depends from a bearing 78. Bearing 78 is attached in a manner known by those skilled in the art to a hollow stern section 80 of hull 12. Stern section 80 need not be watertight. At an end of stern post 76 opposite its dependency from bearing 78, is a blade 82. Accordingly, this assembly make up a steering mechanism for amphibious vehicle 10 when it is being propelled in water. The mechanism comprises the steering assembly of handlebars 32 and steering column 30 connected by dis 70, rod 72, and arm 74 to a rudder 84. The rudder 84 is therefore the assemble of stern post 76 and blade 82. By turning the handlebars to the right, an operator of the amphibious vehicle 10 is capable of steering the amphibious vehicle 10 to the right, as blade 82 is turned to the right side of hull 12.

It is contemplated that the amphibious vehicle be made of plastic, formed to material weld all of the watertight chambers as an integral unit, by methods known to those skilled in the art.

It is within the ambient of the present invention to covering any obvious modifications of the preferred embodiment disclosed in these specifications, provided such modifications fall within the scope of the appended claims. For example, it is foreseen that front axle 48 and the wheels 66 thereon may be operated independently of rear axle 52 with the wheel 66 thereon. It is foreseen that the vanes 68 may radiate straight outwardly, without curving to grip the surface, so that the amphibious vehicle may be constructed to move forwardly and backwardly with equal proficiency. It is also foreseen that the flotation body 16 may be situated in the hull rearwardly of the steering column 30, so that a passageway 18 would not have to extend therethrough. Furthermore, it is foreseen that a steering mechanism may be substituted which has a cable in the place of rod 72 and/or a steering wheel in place of the place of handlebars 32. Yet still it is contemplated that the pedaling means may be replaced by an automated system, whereby a motor would turn crank shaft 22, without departing from the spirit and scope of the present invention.

It is therefore to be understood that the construction details, material, shape and dimensions of the amphibious vehicle 10 can be modified without departing from the spirit and scope of the present invention. It is therefore to be understood that the construction details, material, shape and dimensions of the amphibious vehicle 10 can be modified without departing from the spirit and scope of the present invention.

I claim:

1. An amphibious vehicle having a front and rear and adapted to be driven on a firm surface, with its upper side more remote from the firm surface than its lower side, and on sandy, soft, and liquid surfaces, the vehicle comprising:
   a hull disposed along an axis extending from said front to said rear, the hull having a seat portion on its upper side, and the hull having a flotation body that comprises a hollow airtight interior extending substantially from said front to said rear;
   at least three cylindrical wheels, each wheel having an airtight, hollow chamber, and each having vanes that radiate outwardly;
   axle means for connecting said at least three cylindrical wheels to said hull and for revolving said at least three cylindrical wheels to propel the amphibious vehicle forward when said axle means is revolved by driving means;
   driving means for revolving said axle means;
   rudder means for controlling the direction in which the amphibious vehicle is driven when being propelled through water; and
   steering means for turning at least one of said at least three wheels to control the direction in which the amphibious vehicle is driven when being propelled over firm, sandy, soft, and liquid surfaces, said steering means operatively connected to said rudder means.

2. The amphibious vehicle claimed in claim 1, wherein said axle means is a front axle and a rear axle and wherein said at least three cylindrical wheels are four cylindrical wheels, two of said wheels being front wheels mounted on said front axle, one of each of said front wheels on each side of said hull, and two of said wheels being rear wheels mounted on said rear axle, one of said rear wheels mounted on each side of said hull.

3. The amphibious vehicle claimed in claim 2, wherein said vanes also curve counterclockwise from a view with the wheel, on which the vanes are disposed, in the foreground and the hull, to which the wheel is connected, in the background.

4. The amphibious vehicle claimed in claim 1, wherein said flotation body has a walled passageway extending through a front portion thereof, said walled passageway being integral with said floatation body, and wherein said steering means comprises a steering column inserted into said walled passageway to extend along said passageway through said flotation body without breaching the airtight interior of the flotation body.

5. The amphibious vehicle claimed in claim 4, wherein said steering means further comprises handlebars mounted on said steering column at the upper extent thereof.

6. An amphibious vehicle having a front and rear and adapted to be driven on a firm surface, with its upper side more remote from the firm surface than its lower side, and on sandy, soft, and liquid surfaces, the vehicle comprising:
   a hull disposed along an axis extending from said front to said rear, the hull having a seat portion on its upper side, and the hull having a flotation body that comprises a hollow airtight interior extending substantially from said front to said rear;
   four cylindrical wheels, each wheel having an airtight, hollow chamber, and each having vanes that radiate outwardly;
   a front axle means and a rear axle means for connecting said four cylindrical wheels to said hull, two of said wheels being front wheels mounted on said front axle, one of each of said front wheels on each side of said hull, and two of said wheels being rear wheels mounted on said rear axle, one of said rear wheels mounted on each side of said hull, said front axle and said rear axle for revolving said four cylindrical wheels to propel the amphibious vehicle forward when said axle means are revolved by driving means;
   driving means for revolving said axle means, said driving means including a crank shaft having two ends, said crank shaft depending from said hull at the underside thereof and disposed generally perpendicular to said axis, a crank arm disposed generally perpendicular to said crank shaft at each of its two ends, pedals depending generally perpendicularly from said crank arms, a sprocket wheel mounted on said crank shaft, at least one sprocket wheel mounted on at least one of said front and rear axles, and a sprocket chain connecting said sprocket wheel mounted on said crank shaft and said one of said front and rear axles, so that, when said pedals are pressed and released in a pedaling action, said crank shaft revolves, revolving said sprocket wheel mounted thereon and imparting revolution to said one of said front and rear axles by said sprocket chain and thereby causing at least one of said wheels to revolve;

rudder means for controlling the direction in which the amphibious vehicle is driven when being propelled through water; and steering means for turning at least one of said four cylindrical wheels to control the direction in which the amphibious vehicle is driven when being propelled over firm, sandy, soft, and liquid surfaces, said steering means operatively connected to said rudder means.

* * * * *